(12) United States Patent
Gila et al.

(10) Patent No.: US 7,320,379 B2
(45) Date of Patent: Jan. 22, 2008

(54) DEVICE FOR OCCUPANT PROTECTION IN A MOTOR VEHICLE AND FOR ANTI-THEFT PROTECTION OF THE MOTOR VEHICLE

(75) Inventors: Janos Gila, Mödling (AT); Jürgen Herold, Aschaffenburg (DE); Klaus Hofbeck, Neumarkt (DE); Wolfgang Konrad, Mödling (AT); Birgit Rösel, Regensburg (DE); Stephan Zecha, Hösbach (DE)

(73) Assignee: Siemens Aktiengesellschaft, Munich (DE)

( * ) Notice: Subject to any disclaimer, the term of this patent is extended or adjusted under 35 U.S.C. 154(b) by 366 days.

(21) Appl. No.: 10/536,042

(22) PCT Filed: Oct. 31, 2003

(86) PCT No.: PCT/DE03/03622

§ 371 (c)(1),
(2), (4) Date: May 20, 2005

(87) PCT Pub. No.: WO2004/045916

PCT Pub. Date: Jun. 3, 2004

(65) Prior Publication Data

US 2006/0043710 A1    Mar. 2, 2006

(30) Foreign Application Priority Data

Nov. 20, 2002 (DE) .............................. 102 54 203

(51) Int. Cl.
*B60R 25/00* (2006.01)
(52) U.S. Cl. ................. 180/287; 340/426.16; 280/735; 307/10.2
(58) Field of Classification Search ............. 340/426.1, 340/426.16, 426.17, 426.13, 5.2, 5.31, 5.3, 340/5.33, 5.61; 307/10.2; 701/45–47; 280/735; 180/287

See application file for complete search history.

(56) References Cited

U.S. PATENT DOCUMENTS 5,531,472 A    7/1996   Semchena et al.

(Continued)

FOREIGN PATENT DOCUMENTS

DE    196 30 769 A1    2/1998

(Continued)

*Primary Examiner*—Paul N. Dickson
*Assistant Examiner*—Drew J. Brown
(74) *Attorney, Agent, or Firm*—Laurence A. Greenberg; Werner H. Stemer; Ralph E. Locher

(57) ABSTRACT

The invention relates to a device for occupant protection in a motor vehicle and for anti-theft protection of the motor vehicle, comprising an airbag (3), which may be inflated with gas by means of a filling device, a transceiver (5), for electromagnetic waves (6) and an occupant protection analytical unit (81) connected thereto. An occupant protection interrogation unit (41) is arranged on the inflatable airbag (3), which is wirelessly interrogated by the transceiver (5). Information on the degree and/or speed of unfolding of the airbag is thus provided to the occupant protection analytical unit (81). The transceiver (5) may furthermore wirelessly interrogate a portable anti-theft interrogation unit (42), for example, a chipcard and hence provide an anti-theft analytical unit (82) with information about the authorisation of the anti-theft interrogation unit (42) and/or the separation of the anti-theft interrogation unit (42) from the transceiver (5) based on the returned signal.

13 Claims, 2 Drawing Sheets

U.S. PATENT DOCUMENTS

| | | | |
|---|---|---|---|
| 5,723,911 A * | 3/1998 | Glehr ........................ | 340/10.5 |
| 6,164,694 A * | 12/2000 | Yoshida et al. ............. | 280/736 |
| 6,538,560 B1 * | 3/2003 | Stobbe et al. .............. | 340/5.72 |
| 6,796,578 B2 * | 9/2004 | White et al. ................ | 280/735 |
| 6,809,629 B2 * | 10/2004 | Heide et al. ............... | 340/5.61 |
| 6,946,949 B2 * | 9/2005 | Heide et al. ............... | 340/5.61 |
| 7,036,846 B2 * | 5/2006 | Zecha ........................ | 280/735 |
| 2002/0008615 A1 | 1/2002 | Heide et al. | |
| 2004/0183277 A1 | 9/2004 | Zecha | |

FOREIGN PATENT DOCUMENTS

| | | |
|---|---|---|
| DE | 198 25 817 C1 | 9/1999 |
| DE | 199 08 167 A1 | 8/2000 |
| DE | 199 26 845 A1 | 10/2000 |
| DE | 101 53 503 A1 | 5/2003 |
| EP | 0 812 741 A1 | 12/1997 |
| EP | 0 836 971 A1 | 4/1998 |
| EP | 848123 A2 * | 6/1998 |
| EP | 0 952 052 A2 | 10/1999 |

* cited by examiner

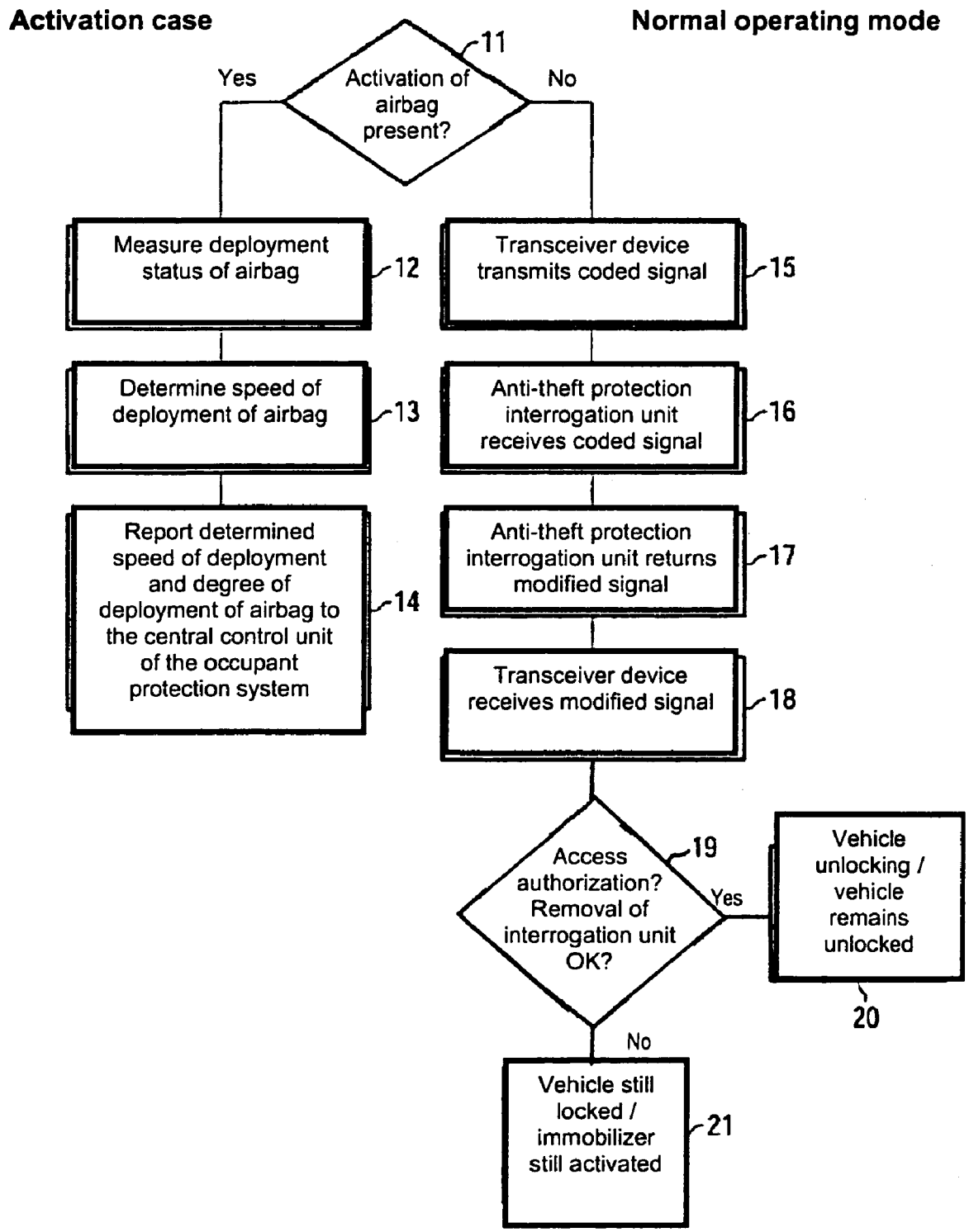

DEVICE FOR OCCUPANT PROTECTION IN A MOTOR VEHICLE AND FOR ANTI-THEFT PROTECTION OF THE MOTOR VEHICLE

BACKGROUND OF THE INVENTION

Field of the Invention

The invention relates to a device for occupant protection in a motor vehicle and for anti-theft protection of the motor vehicle, with at least parts of a detection device for detecting the deployment behavior of an airbag for occupant protection in a motor vehicle also being used simultaneously for access control in terms of an anti-theft protection of the motor vehicle.

In the automobile industry the best possible protection for a vehicle occupant by means of an airbag that deploys in the event of an accident is usually ensured when the vehicle occupant to be protected is sitting in an upright position, wearing a seatbelt and leaning back on the vehicle seat, with the result that the occupant maintains a certain minimum distance from the airbag activation unit.

However, in order also to protect such vehicle occupants who are not in this preferred sitting position as effectively as possible from injuries in the event of an accident, use is made of devices for occupant protection in a motor vehicle which adjust the activation behavior of an airbag to take account of such a so-called "out-of-position" sitting position of a vehicle occupant.

If, for example, a vehicle occupant is in a leaning-forward position, a fully deploying airbag can even lead in certain circumstances to an injury of the vehicle occupant. In this case it is of advantage, for example, to fire only a first stage of the airbag, in which the airbag inflates only partially and therefore more gently. In certain conditions it can even protect a vehicle occupant from additional injuries if the inflation of the airbag is totally prevented.

The European patent application EP 0 836 971 A1 discloses a device in which the inflation behavior of the airbag is monitored during its deployment for the purpose of detecting an "out-of-position" sitting position of a vehicle occupant:

If an object or a person is located too close to the airbag activation unit, then the airbag cannot deploy unobstructed. The obstructed deployment of the airbag is detected by the device and indicates an "out-of-position" sitting position of the vehicle occupant. In order to avoid a possible injury to the vehicle occupant due to this identified sitting position, the inflation behavior of the airbag is adjusted accordingly, by the airbag being inflated at a reduced speed for example.

An infrared transceiver unit is used in order to detect the deviating inflation behavior of the airbag, which transceiver unit first transmits infrared radiation into the airbag and receives back the infrared radiation from the advantageously reflection-coated inner material of the airbag. The reflected radiation is evaluated with respect to its transit time since the transmission and/or with respect to its frequency shift in different deployment directions of the airbag. This information on the deployment behavior of the airbag is transmitted to a control device which can influence the inflation characteristic of the airbag accordingly (column 7, line 51, to column 8, line 23, and claim 1 in that publication).

From a completely different field, the field of anti-theft protection of a motor vehicle, systems are known which are able to check, by contactless means, the authorization of a person to gain access to the motor vehicle and only allow authorized persons to access and operate the motor vehicle.

Worthy of mention in this context is, for example, the anti-theft protection system disclosed in the unexamined German application 199 57 536 A1, which discloses a transceiver unit in a motor vehicle, which transceiver unit transmits radar signals that are modulated over a broad bandwidth and then waits for echo signals. A code transmitter which receives the radar signal sends an additionally modulated and coded signal back to the transceiver unit. An evaluation unit analyzes all the echo signals received by the transceiver unit firstly for an authorization of the code transmitter and secondly in order to determine the distance of the code transmitter from the transceiver unit.

SUMMARY OF THE INVENTION

The object of the present invention is to create a device and a method for occupant protection in a motor vehicle, wherein at least parts of the device can also be used for anti-theft protection of the motor vehicle.

This object is achieved by means of a device for occupant protection in a motor vehicle and for anti-theft protection of the motor vehicle as claimed in claim 1, which device has an airbag that can be inflated with gas by means of a filling device, together with a transceiver device for electromagnetic waves and an occupant protection evaluation device connected thereto. Disposed on the airbag is an occupant protection interrogation unit which can be interrogated by contactless means by the transceiver device. In this way the occupant protection evaluation device is provided with information regarding the degree of deployment and/or the speed of deployment of the airbag. The transceiver device is also able to interrogate a portable anti-theft protection interrogation unit by contactless means and thereby provide an anti-theft protection evaluation device with information regarding the authorization of the anti-theft protection interrogation unit and regarding the distance of the anti-theft protection interrogation unit from the transceiver device on the basis of the signal returned by the anti-theft protection interrogation unit.

In this case the transceiver device is usefully disposed within the vehicle instrument panel, preferably in close proximity to the filler opening of the airbag, so that the electromagnetic radiation transmitted or received by the transceiver device can be transmitted unobstructed into the airbag or received unobstructed from the surface of the deploying airbag. It is self-evident that in this case the arrangement within the vehicle instrument panel must be embodied in such a way that simultaneous use of the transceiver unit for access control is still possible all the same.

In an advantageous embodiment as many electronic structural units as possible of the device according to the invention can be used for receiving and/or transmitting signals from and/or to an occupant protection interrogation unit and an anti-theft protection interrogation unit. Shared use of the transmit/receive antenna is conceivable, for example.

In mutually separate occupant protection and anti-theft protection devices, a suitable occupant protection evaluation device is typically used for occupant protection and a suitable anti-theft protection evaluation device is typically used for anti-theft protection. In the interests of the best possible use of electronic structural units both for occupant protection and for anti-theft protection in a motor vehicle it is, however, of advantage if the occupant protection evaluation device and the anti-theft protection evaluation device are part of a combined evaluation device accommodated within a single housing.

A corresponding combined evaluation device whose operation as an occupant protection evaluation device or as an anti-theft protection evaluation device is set simply by different software operating modes is particularly suitable.

In a suitable embodiment the occupant protection interrogation units that transmit the radiation received by the transceiver unit back to the transceiver unit are to be embodied as reflectors disposed on the inner surface of the airbag.

If a plurality of such reflectors are used in an airbag, it is furthermore of advantage to use polarizing reflectors. If polarizing reflectors of this kind are disposed at different points on the inner surface of the airbag, it is possible to distinguish, on the basis of the received polarization level of the electromagnetic radiation, from which reflector unit the received radiation originates.

In order to be able to distinguish a larger number of occupant protection interrogation units from one another, however, it is also advantageous to embody them as transponders. Transponder units of this kind receive the electromagnetic wave transmitted by the transceiver device and use at least a part of its energy as supply energy for powering a logic circuit which transmits the received electromagnetic wave, modified by means of an individual code, back to the transceiver device.

In this case the logic circuit can be embodied in the simplest manner as a switch which merely switches a transmit/receive antenna on or off in accordance with a stored code. Also possible, however, are more complicated logic circuits which allow a correspondingly more complicated coding. For example, the logic circuit can also be formed by means of an oscillator which actively generates a signal which, upon being excited by a signal or a wave from the transceiver device, is radiated back as a wave to the transceiver device. In this case each occupant protection interrogation unit can radiate on a different frequency. It is also possible to use different modulations at the same frequency. The important thing, in any case, is that the signals of the individual occupant protection interrogation units can be differentiated by the transceiver device.

A method according to the invention for protecting occupants of a motor vehicle and for anti-theft protection of the motor vehicle using one of the already described embodiments of the device according to the invention is the subject matter of claim 9.

When a device according to the invention is used, it makes sense to separate the operation of a motor vehicle into two modes, the normal operating mode of the motor vehicle, without completed activation of the filler device for filling the inflatable airbag, and the activation case, in which an activation of the filler device for filling the inflatable airbag has already been completed or is imminent.

In the normal operating mode of the motor vehicle the transceiver device according to the invention serves for anti-theft monitoring of the motor vehicle, whereas in the activation case the same transceiver device serves exclusively to determine the degree of deployment and/or the speed of deployment of the airbag.

In order to be able to separate the two operating modes of the combined device according to the invention even more effectively it is also of advantage that differently coded signals are used in each case for the interrogation of the anti-theft protection interrogation unit by the transceiver device and for the interrogation of the degree of deployment and/or the speed of deployment of the airbag.

It is furthermore particularly advantageous to use the device according to the invention also for monitoring the proper functional performance of the occupant protection interrogation units, for example the transponders. The transceiver unit typically transmits signals in any case at regular intervals in order to interrogate the anti-theft protection interrogation units, from chipcards for vehicle access control for example, and evaluates the received signals of the anti-theft protection interrogation units with regard to an access authorization of the anti-theft protection interrogation units.

During these regular interrogations of the anti-theft protection interrogation units by the transceiver unit, suitable test transmit signals are transmitted simultaneously or at least offset in time thereto from the transceiver unit to the occupant protection interrogation units. The response signals transmitted back by the occupant protection interrogation units, the transponders for example, are evaluated in terms of specific receive signal parameters, by means of which the evaluation unit can promptly identify a possible malfunction.

A detected malfunction of at least one of the occupant protection interrogation units can then be taken by the occupant protection evaluation device as a reason for adapting the "out-of-position" detection in the case of activation of the device according to invention to the failure of the corresponding occupant protection interrogation unit, through to shutdown of the "out-of-position" detection. If appropriate, the possibility that the occupant protection system is functioning only inadequately can additionally be indicated to the driver of the vehicle in question by means of a warning signal in the form of an airbag warning light.

BRIEF DESCRIPTION OF THE DRAWING

The invention will be described below with reference in each case to an exemplary embodiment of the device according to the invention and of the method according to the invention, in which:

FIG. 2 shows a method according to the invention using the device according to the invention.

DESCRIPTION OF THE PREFERRED EMBODIMENTS

Figure 1:
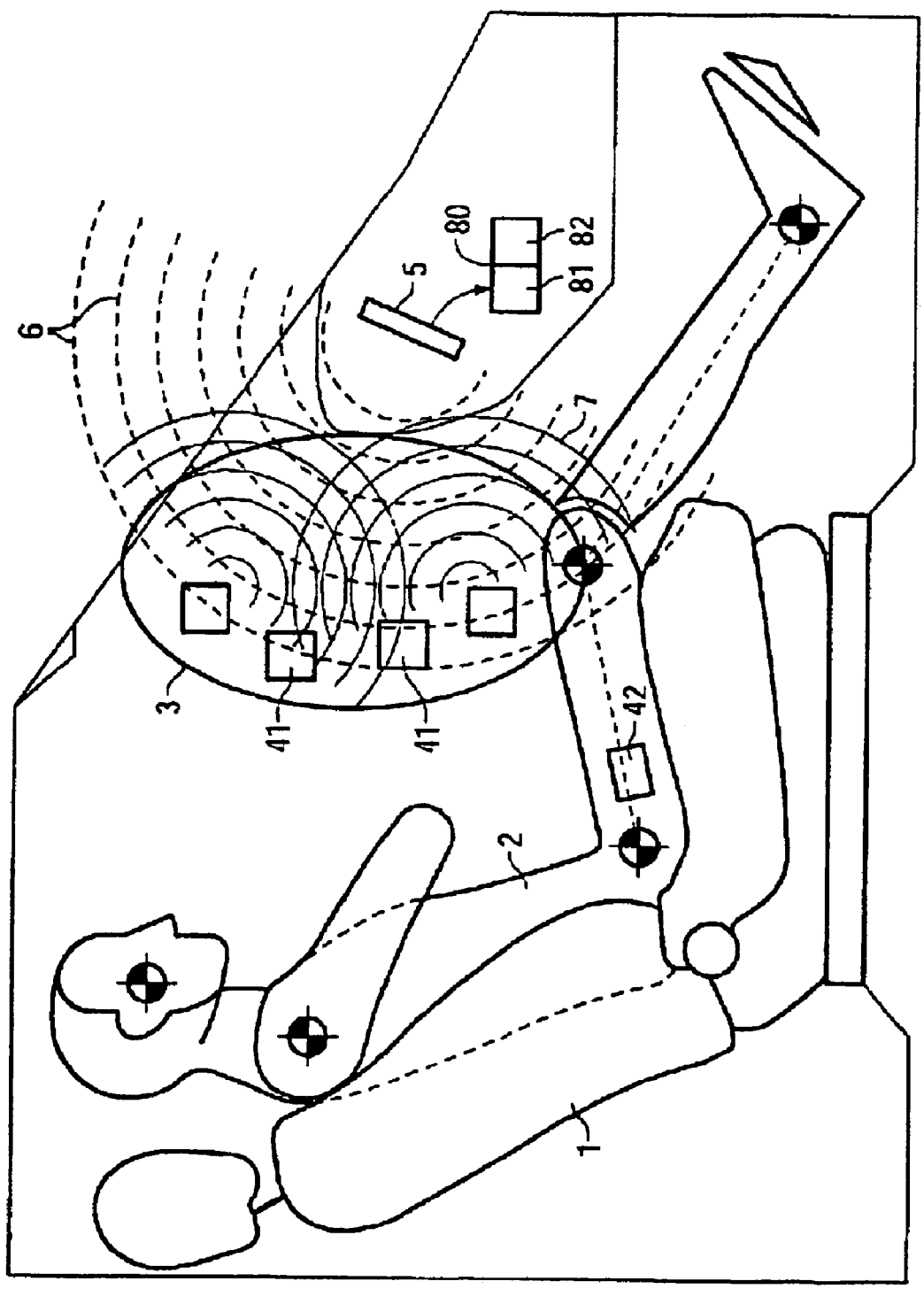
FIG. 1 shows a device according to the invention in a motor vehicle.

FIG. 1 shows a schematic cross-sectional representation of a vehicle cabin with a vehicle seat 1 and a person 2 sitting thereon. An inflated airbag 3 is equipped with a plurality of occupant protection interrogation units 41 which can be embodied as simple reflectors or as transponders. A transceiver device 5 which is connected to an occupant protection evaluation device 81 transmits electromagnetic waves to the occupant protection interrogation units 41. The latter return suitably coded waves 7 which are received by the transceiver device 5 and processed by the occupant protection evaluation device 81.

But the transceiver device 5 is active even if the airbag is not inflated. The transceiver device 5 transmits at regular intervals transmit signals 6 which are received by a code card 42. As shown schematically in FIG. 1, the vehicle occupant carries the code card 42 with him in his trouser pocket. The code card 42 transmits a modulated echo signal back to the transceiver unit 5.

The returned modulated echo signal of the code card 42 is received by the transceiver unit 5. The received signal is forwarded to the anti-theft protection evaluation device 82, which identifies the echo signals with regard to an access authorization of the code card 42 and determines the distance between the code card 42 and the transceiver unit 5. In the present case shown in FIG. 1, although the anti-theft protection evaluation device 82 detects an access authorization of the code card 42, it can establish on the basis of the information regarding the very small distance of the code transmitter 42 from the transceiver unit 5 that the vehicle passenger is located in the interior of the vehicle. As a result of this information the anti-theft protection evaluation device 82 will not initiate any unlocking of the vehicle.

In order to obtain better information regarding the distance and the precise position of a code card 42 in relation to the transceiver unit 5, the signals of the transceiver unit 5 are compared with the signals of further transceiver units at other points in the motor vehicle, as a result of which, based on the known evaluation methods in triangulation measurements for example, the precise position of a code card 42 can be determined.

If the anti-theft protection evaluation device 82 establishes in this way that, for example, an authorized code card 42 or a person 1 having an authorized code card 42 is approaching the vehicle, then the anti-theft protection evaluation device 82 initiates an unlocking of the vehicle and allows the vehicle to put into operation.

The reference numeral 80 indicates a combined evaluation device 80 in which the occupant protection evaluation device 81 and the anti-theft protection evaluation device 82 are located in a single device within a housing. As already explained above, the combined evaluation device 80 can separate the two functionalities of an occupant protection evaluation device 81 and an anti-theft protection evaluation device 82 from each other by reason of a different software mode being provided for each individual functionality.

FIG. 2 shows a method according to the invention wherein the device according to the invention is used both for occupant protection in a motor vehicle and for anti-theft protection of the motor vehicle:

In a first method step 11 it is determined whether an activation decision for the inflation of the airbag 3 is present. This is communicated to the occupant protection evaluation device 81 within the evaluation device 80 by the central control unit of the occupant protection system.

If such an activation decision is present, the deployment status and deployment speed of the airbag are determined in a second and third method step 12 and 13 with the aid of the transceiver unit 5 and with the aid of the occupant protection interrogation units 41 disposed on the inside of the airbag 3. As already described above, this evaluation takes place in the occupant protection evaluation device 81 on the basis of the signals 6 transmitted by the transceiver unit and the modified signals 7 which are received back, the return times of which differ according to the distance of the respective occupant protection interrogation unit 41 from the transceiver unit 5, and the frequencies of which are shifted in different degrees toward higher values according to the speed of deployment of the airbag 3 as a result of the Doppler effect.

The information regarding the respective degree of deployment and speed of deployment of the airbag 3, and in particular the important information resulting therefrom as to whether there is an obstacle in the deployment space of the airbag 3, is subsequently communicated by the occupant protection evaluation device 81 within the evaluation device 80 to the central control unit of the occupant protection system. This is shown as method step 14 in FIG. 2.

The presence of an obstacle in the deployment space of the airbag 3 can then lead to the inflation of the airbag 3 being modified such that the vehicle occupant is still afforded the best possible protection by the airbag according to the detected "out of position" sitting position of said vehicle occupant. This can be achieved, for example, in that a second activation stage for full inflation of the airbag is not activated.

If no activation decision for the inflation of the airbag 3 is present, the device according to the invention is used in the normal operating mode. The normal operating mode is likewise illustrated with the aid of FIG. 2:

In the first method step 15 the transceiver device 5 transmits a coded electromagnetic signal 6.

In method step 16 the code card 42 receives the coded signal 6, modifies the signal, using frequency modulation for example, and transmits a modified signal 7 back to the transceiver device 5.

In the following method step 18 the transceiver device 5 receives the modified signal 7 and forwards it to the anti-theft protection evaluation device 82 within the evaluation device 80.

In method step 19 the access authorization is checked within the anti-theft protection evaluation device 82 by comparisons of the received modified signals 7 with stored samples of receive signals having access authorization. In addition, the anti-theft protection evaluation device 82 determines, possibly using corresponding receive signals of transceiver units 5 at other points of the motor vehicle, the distance of the chipcard 42 from the transceiver unit 5 and also establishes in particular whether the code card 42 is located inside or outside the motor vehicle.

If the code card 42 transmits an access-authorized modified signal 7 back to the transceiver unit 5, in method step 20 the vehicle is unlocked or remains unlocked if the chipcard 42 is already located inside the motor vehicle.

If the code card 42 does not transmit an authorized modified signal 7 back to the transceiver unit 5, the vehicle remains locked (method step 21). If the vehicle is additionally equipped with an electronic immobilizer, the latter also remains activated, with the result that the possessor of a non-authorized code card 42 can neither enter the vehicle nor, following a forced entry into the vehicle for example, bring the motor vehicle into a state in which it can be driven away.

The just described steps of the method according to the invention using a device according to the invention for occupant protection in a motor vehicle and for anti-theft protection of the motor vehicle can, of course, also be performed in a different sequence. In this case the only thing that is crucial for the use of a device according to the invention is that at least parts of a transceiver device are used both for determining the degree of deployment of an airbag for occupant protection and for determining its speed of deployment, and also for anti-theft protection of the motor vehicle by means of a contactless interrogation of key code cards, for example chipcards, using microwave, radar or ultrasound signals or similar.

We claim:

1. A device for occupant protection in a motor vehicle and for anti-theft protection of the motor vehicle, the device comprising:
   an airbag having a filler device for inflating said airbag with gas;
   a transceiver device for transmitting electromagnetic waves;
   an occupant protection evaluation device connected to said transceiver device;

at least one occupant protection interrogation unit disposed on said airbag, said transceiver device interrogating said occupant protection interrogation unit contactlessly resulting in information regarding a degree of deployment and/or a speed of deployment of said airbag being provided to said occupant protection evaluation device;

an anti-theft protection evaluation device; and at least one portable anti-theft protection interrogation unit being interrogated contactlessly by said transceiver device resulting in further information regarding an authorization of said anti-theft protection interrogation unit and/or regarding a distance of said anti-theft protection interrogation unit from said transceiver device on a basis of a signal returned by said anti-theft protection interrogation unit, said further information being provided to said anti-theft protection evaluation device.

2. The device according to claim 1, wherein said transceiver device is disposed within a vehicle instrument panel.

3. The device according to claim 1, further comprising at least one shared electronic structural unit for a reception and/or transmission of signals of said occupant protection interrogation unit and of said anti-theft protection interrogation unit.

4. The device according to claim 3, wherein said shared electronic structural unit is an antenna.

5. The device according to claim 1, wherein said occupant protection evaluation device and said anti-theft protection evaluation device form a part of a combined evaluation device having and accommodated within a single housing.

6. The device according to claim 5, wherein said occupant protection evaluation device and said anti-theft protection evaluation device have different software operating modes in said combined evaluation device.

7. The device according to claim 1, wherein said occupant protection interrogation unit is a reflector.

8. The device according to claim 7, wherein said reflector is polarizing.

9. The device according to claim 1, wherein said occupant protection interrogation unit is a transponder.

10. The device according to claim 9, wherein said transponder has a logic circuit which enables a coded wave to be transmitted back to said transceiver device.

11. A method for protecting occupants of a motor vehicle and for anti-theft protection of the motor vehicle, which comprises the steps of:

in a normal operating mode of the motor vehicle, without completed activation of a filler device for filling an inflatable airbag, performing the steps of:

transmitting a coded signal using a transceiver device;

receiving the coded signal in a portable anti-theft protection interrogation unit;

transmitting back, via the portable anti-theft protection interrogation unit, a modified coded signal to the transceiver device;

receiving the modified coded signal in the transceiver device and forwarding the modified coded signal to an anti-theft protection evaluation device;

determining in the anti-theft protection evaluation device, from the modified coded signal, information regarding an authorization of the anti-theft protection interrogation unit and/or regarding a distance of the anti-theft protection interrogation unit from the transceiver device;

in an activation case, upon completed activation of the filler device for filling the inflatable airbag, performing the steps of:

using the transceiver device for interrogating signals of an occupant protection interrogation unit of the inflatable airbag by a contactless method resulting in further information; and providing an occupant protection evaluation unit connected to the transceiver unit with the further information for determining a degree of deployment and/or a speed of deployment of the inflatable airbag.

12. The method according to claim 11, which further comprises:

using differently coded signals for interrogation of the anti-theft protection interrogation unit by the transceiver device than for interrogation of the degree of deployment and/or the speed of deployment of the inflatable airbag.

13. The method according to claim 11, which further comprises in the normal operating mode of the motor vehicle, without completed activation of the filler device for filling the inflatable airbag:

performing an interrogation of the occupant protection interrogation unit by the transceiver device at regular time intervals and as a result additional information regarding a proper functioning of the occupant interrogation unit is provided for the occupant protection evaluation device.

* * * * *